United States Patent [19]

Baliozian

[11] 4,417,399
[45] Nov. 29, 1983

[54] DEVICE FOR THE CALCULATION OF THE CHARACTERISTICS OF RECTILINEAR GEOMETRIC SHAPES

[75] Inventor: Mardick Baliozian, Feucherolles, France

[73] Assignee: Tekno AG, Zurich, Switzerland

[21] Appl. No.: 363,434

[22] Filed: Mar. 30, 1982

[30] Foreign Application Priority Data

Apr. 3, 1981 [FR] France ............................ 81 06732

[51] Int. Cl.³ ............................................ B43L 7/00
[52] U.S. Cl. ...................................... 33/448; 33/468; 33/DIG. 9
[58] Field of Search ................... 33/DIG. 9, 427, 428, 33/464, 452, 453, 430, 434, 438, 448, 468

[56] References Cited

U.S. PATENT DOCUMENTS

| | | | |
|---|---|---|---|
| 881,981 | 3/1908 | Watson | 33/438 |
| 1,883,628 | 10/1932 | Dreifuss | 33/438 |
| 2,403,614 | 7/1946 | Ross | 33/DIG. 9 |
| 2,822,736 | 2/1958 | Padgett | 33/437 |
| 3,835,298 | 9/1974 | DeAndrea | 33/430 |
| 3,950,853 | 4/1976 | Andrew | 33/438 |

*Primary Examiner*—Willis Little
*Attorney, Agent, or Firm*—Young & Thompson

[57] ABSTRACT

Device for the calculation of the geometrical characteristics of rectangles for the framing of various objects, usable especially in photography, architecture, industrial design.

This device comprises a plate in which there is formed a preferably square aperture and which carries a graduation indicating a series of ratios between the contiguous sides of rectangles, a ruler mounted for pivoting on the plate and graduated in length, and an element mounted for pivoting on a slider displaceable on the ruler, the element having two perpendicular arms graduated in length, the element being capable of being locked in any desired angular position as a function of the rectangle to be defined.

The invention permits of framing rectangles within predetermined limits, easily and with precision, indicating instantaneously to the user the geometrical characteristics of these rectangles.

6 Claims, 5 Drawing Figures

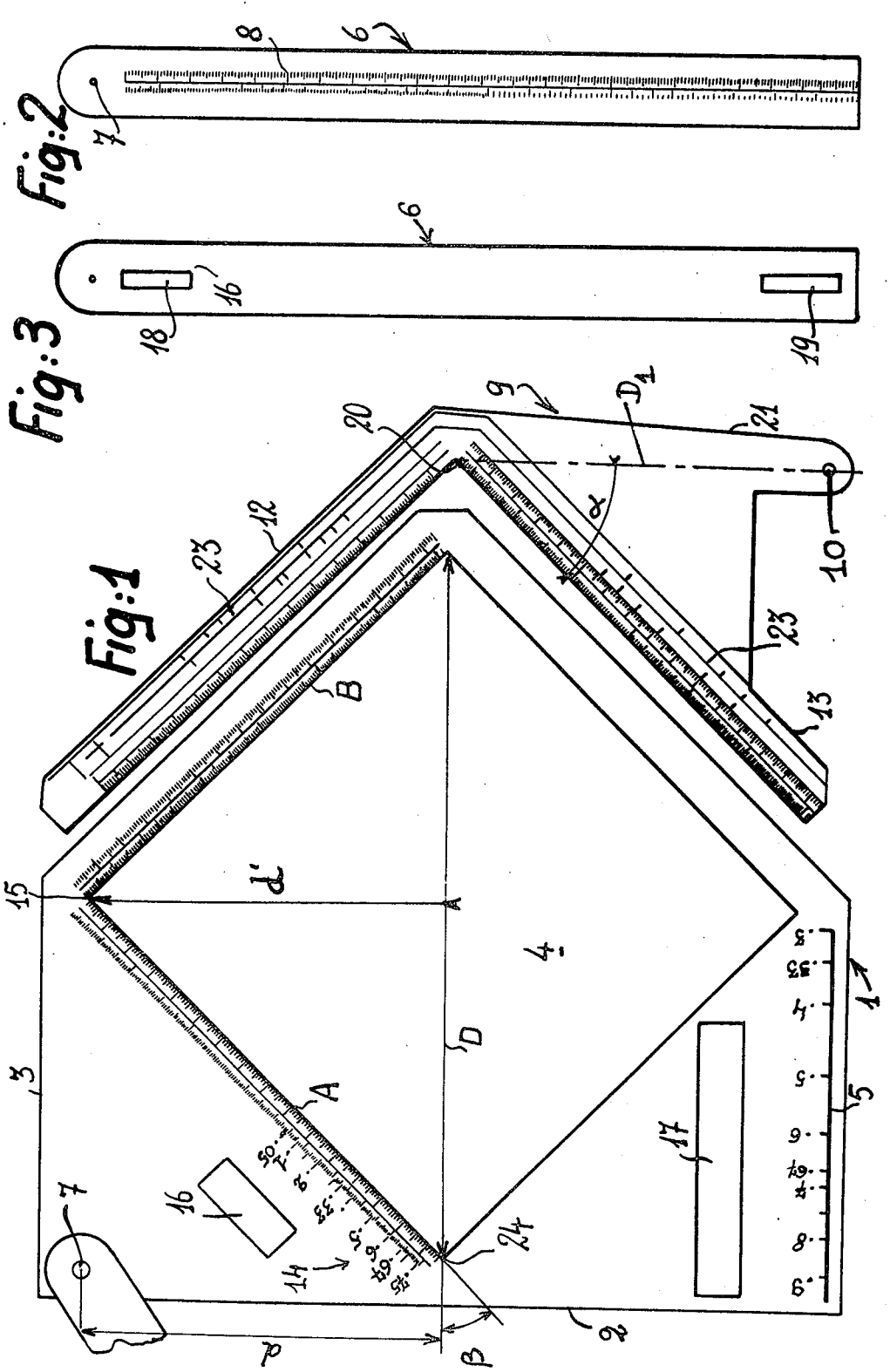

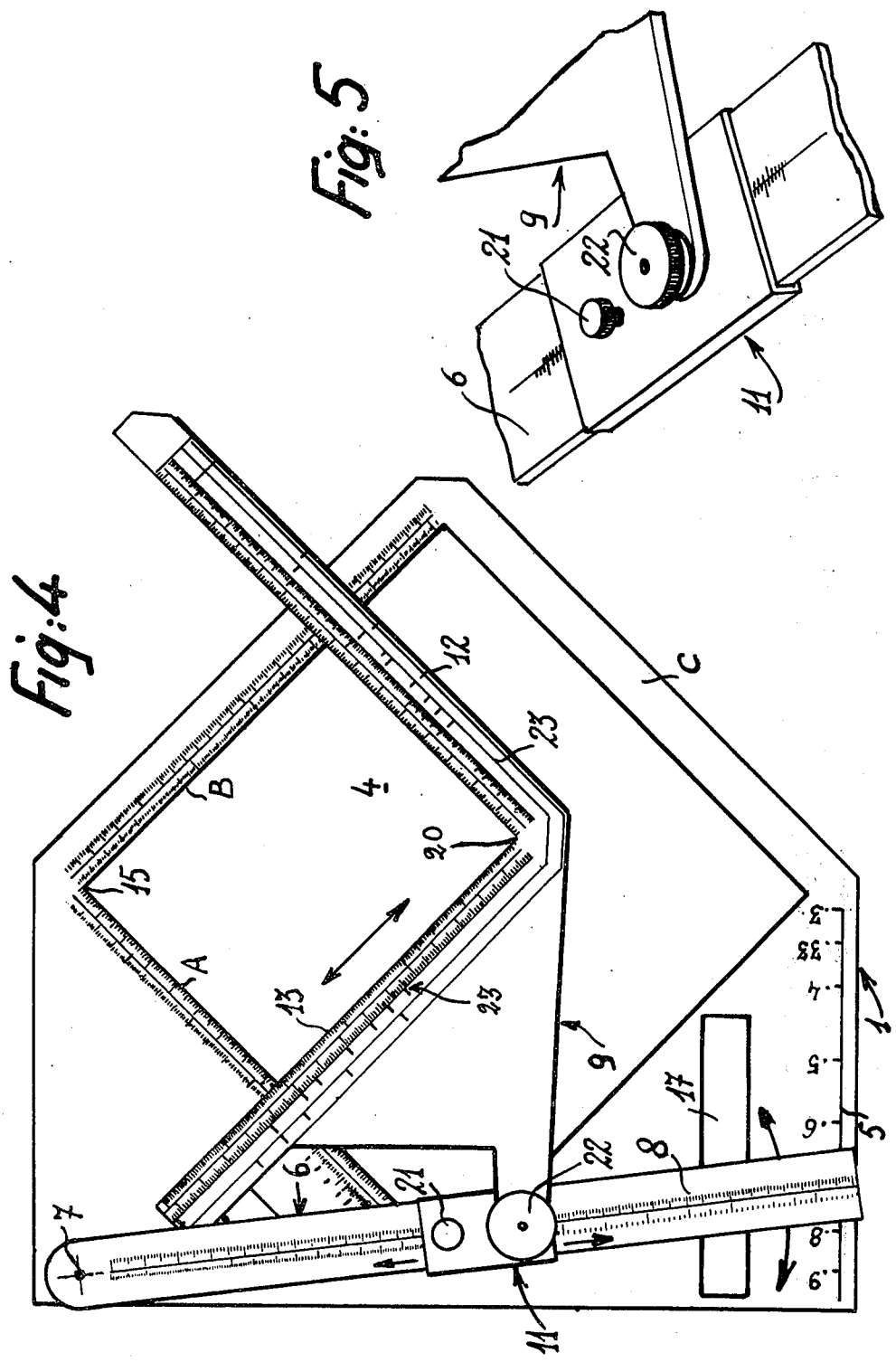

DEVICE FOR THE CALCULATION OF THE CHARACTERISTICS OF RECTILINEAR GEOMETRIC SHAPES

BACKGROUND OF THE INVENTION

The present invention relates to a device for the calculation of the geometrical characteristics of rectangles, namely:- The ratio of the lengths of the contiguous sides of the rectangle, the lengths of its sides, the length of its diagonal and its surface area.

This device is intended to execute the framing of rectangles or possibly squares of predetermined dimensions on documents or various objects such as photographs and drawings etc., and is usable especially in photography, architecture, industrial design, decoration, etc.

STATEMENT OF PRIOR ART

In order to trace similar rectangles of different dimensions, it is possible to trace the diagnol of the rectangle and then, by tracing lines from different points along this diagonal in directions perpendicular to the sides of the rectangle, it is thus possible to obtain an infinity of similar rectangles.

In order to do this it is possible to use an L-piece, causing it to slide along the diagonal of the rectangle, and ensuring that the two arms of the L are always perpendicular to the corresponding sides of the rectangle which they intersect.

Such a device permits of tracing rectangles on objects such as photographs which are to be reproduced in a specific format.

However this rudimentary device has a very serious drawback consisting in the fact that it necessitates a mechanical part materialising the diagonal, which part thus extends throughout the zone to be examined, which can have very small dimensions.

An embodiment is also known constituted by the assembly of two L-pieces placed perpendicularly to one another at variable distances. This system can possess graduations but does not permit of instantaneously knowing the ratios between the sides of the rectangles, nor of keeping one L-piece firm in relation to the other.

Anothr known device consists of two L-pieces which can slide translationally one in relation to the other. However the ratios between the sides of the different rectangles obtained always remain fixed with such a device, which constitutes an obvious inadequacy.

Another more elaborate known device comprises two L-pieces one of which can be displaced in relation to the other by sliding along a metallic rod articulated at one of its extremities. This device does not indicate the ratios of two adjacent sides of the rectangle, nor the length of its diagonal, nor its surface area, and furthermore is particularly bulky and also heavy in comparison with the dimensions of the rectangle to be measured. Nor does it permit of determining mathematically the ratios of the sides of a rectangle, and it cannot be adjusted in a precise manner for a predetermined ratio.

OBJECT OF THE INVENTION

The invention has the object of remedying these drawbacks by realizing a device permitting of easily obtaining all desired framings in a predetermined range, obtaining immediately by simple reading all the geometrical characteristics of the rectangle (or square) to be framed, this with reduced bulk.

SUMMARY OF THE INVENTION

In accordance with the invention the device for determining the aforesaid characteristics of a rectangle or square comprises:

a plate having two adjacent perpendicular edges, in which a preferably square or possibly rectangular aperture is formed, which plate carries a graduation indicating a series of ratios between the contiguous sides of the rectangles, a ruler mounted pivotably at one of its extremities on the plate, the length of which ruler is at least equal to the diagonal of the aperture pierced in the plate, the extremity of this ruler being capable of coming to intersect the graduation or ratios, an element mounted for rotation on a slider capable of movement along the ruler and provided with perpendicular arms having lengths equal to those of the sides of the aperture of the plate, at least two sides of the aperture of the plate, the arms of the pivoting element and the ruler are graduated in lengths.

When with this device it is intended to frame a part of an object in a desired proportion, for example a part of a photograph which it is desired to enlarge, firstly the graduated ruler is placed in the suitable angular position, the intersection of the extremity of the ruler with the graduation of ratios indicating the value of the ratio of the contiguous sides of the different rectangles which can be framed for this angular position of the ruler.

Then the pivoting element is positioned and locked in such manner as to place its two arms perpendicularly of the contiguous two sides of the aperture of the plate, and then the slider is displaced on the ruler with the lpivoting element.

Next the slider is displaced on the ruler until the arms of the pivoting element fixed to the slider, with the two other perpendicular sides of the aperture of the plate, frame the selected part of the photograph or drawing.

It only remains to lock the slider on the ruler and it is possible to read from the graduations of the device all the numerical characteristics of the rectangle thus selected:- lengths of sides, length of its diagonal read on the ruler, ratio of its sides read directly from the ratio graduations and its surface area, which can be read from a table printed on the plate.

This device has minimum bulk and is extremely simple in use and permits the determination of the characteristics of any rectangle within the range selected and permitted by the dimensions of the aperture, with all necessary precision.

BRIEF DESCRIPTION OF DRAWINGS

Further particular features and advantages of the invention will appear in the course of the following description given with reference to the accompanying drawings which represent a non-limitative form of embodiment thereof.

FIG. 1 is a plan view of the plate and of the associated pivoted element,

FIG. 2 is a view of the graduated ruler from above, before fitting for rotation on the plate in FIG. 1, FIG. 3 is a view of the ruler according to FIG. 2 seen from beneath, FIG. 4 is a plan view of the complete device formed by the assemblying of the various parts which can be seen in FIGS. 1 and 2.

FIG. 5 is a partial perspective view showing the slider disposed on the ruler and the pivoting element articulated on this slider.

DESCRIPTION OF PREFERRED EMBODIMENTS

The device as illustrated in FIGS. 1 to 5 is intended for the calculation of certain characteristics of a rectangle or a square, and can be used especially in photography, architecture, industrial design, etc. to frame objects within the selected rectangle, for example parts of photographs which it is desired to reproduce and enlarge.

The geometrical characteristics of the rectangles under consideration are:

the ratio of the lengths of its contiguous sides, the lengths of its sides, the length of its diagonal and its surface area.

This device comprises:

(a) a plate 1 having two perpendicular adjacent edges 2, 3 and in which an aperture 4 is formed which is preferably square as in the example represented but which may possibly be rectangular; this plate 1 carries a graduation 5 indicating a series of ratios between the sides of corresponding rectangles, going from 0.3 to 0.9. This graduation can equally go up to 1, which would correspond to a square.

(b) a ruler 6 mounted pivotably at one of its extremities on the plate 1, about a pivot spindle 7, the length of which ruler is at least equal to the diagonal (D) of the aperture 4, the extremity of the ruller 6 being capable of intersecting the graduation 5; the ruler carries a graduation 8 in centimeters and/or in inches (system in English-speaking countries).

(c) an element 9 mounted rotatably on a slider 11 capable of movement on the ruler 6 and provided with two perpendicular arms 12, 13 having lengths equal to those of the sides A, B of the aperture 4.

More precisely the arms 12, 13 carry graduations in centimeters and, in the example as represented, in inches, the total length of which is equal to those of the corresponding graduations printed on the sides A, B. It will be noted that a graduation 14 of ratios of the two contiguous sides of rectangles is carried along the side A and ranges from 0.05 to 0.75, this graduation being complementary to the graduation 5.

According to one important characteristic of the invention, the pivot spindle 7 of the ruler 6 is separated from the prolongation of a diagonal D of the aperture 4 by a distance d equal to the interval d' between the apex 15 of the aperture 4 situated on the same side of the diagonal D as the spindle 7 and the said diagonal D.

Thus the pivot spindle 7 of the ruler 6 can move on a straight line parallel to D and passing through the apex 15, but it must always be spaced from the diagonal D by the interval d=d'.

The invention likewise provides mechanical means for locking the ruler 6 on the plate 1 in the selected angular position. These means can be constituted for example by plaques 16, 17 glued to the plate 1 in the zone swept by the ruler 6, and corresponding plaques 18, 19 glued under the ruler 6. These parts can carry hook attachment elements sensitive to pressure, such as the system known under the trade mark "Velcro," the parts 16, 17 being for example the female parts and the parts 18, 19 the male parts. However of course these locking elements of the ruler 6 can be replaced by any other appropriate system operating by pressure.

The slider 12 can be locked on the ruler 6 by means of a knurled knob 21, while the element 9 can be fixed in any angular position in relation to the slider 11 by means of a rotating knob 22 passing through the element 9 and the slider 11. The arms 12, 13 carry graduations 23 such as focal lengths corresponding to different formats such as 35 mm, 24×36, 6×7 cm. of films on which an object located within the rectangle defined by the two movable arms 12, 13 and the complementary sides A, B of the aperture 4 is to be photographed.

On the plate 1 there is also printed or glued a numerical table (not shown to simplify the drawing) indicating the surface areas of rectangles capable of being obtained with this device, by displacing the arms 12, 13 parallel with the sides A and B respectively.

It should be noted that the square aperture 4 (or if appropriate the rectangular aperture) is oriented so that its sides A, B are inclined at 45° to the adjacent edges 2, 3 of the plate 1.

The rotation axis 10 of the element 9 is situated at a distance from the intesection 20 of the arms 12, 13 equal to the distance between the spindle 7 and the apex 15 of the aperture 4. Moreover the angle $\alpha$ between the straight line D1 connecting 10 and 20 and the graduated edge of the arm 13 is equal to the inclination $\beta$ of the sides A and B to the edges 2, 3.

The utilisation and technical advantages of the device as just described are as follows:

First of all the ruler 6 is placed in the angular position corresponding to the value of the ratio between two contiguous sides of the rectangle which it is desired to obtain, read on the graduation 5. Thus in the position of the rule 6 as illustrated in FIG. 4, the ratio read on the graduation 5 at the intersection with the ruler 6 is slightly less than 0.8. Then the ruler 6 is locked in this position by pressure upon the parts 16, 17 which come into hook engagement with the corresponding parts 18, 19.

Then the slider 11 is caused to slide on the ruler 6 in such manner as to place the arm 12 on the side C of the aperture 4, parallel thereto and to the side A. While the arms 12, 13 are held by one hand in this position, in which they define a rectangle with the sides A and B, the operator locks the element 9 in rotation in relation to the slider 11 by screwing the knurled knob 22.

It is then possible to cause the element 9 and the slider 11 fast therewith to slide simultaneously along the ruler 6. In this displacement along the ruler 6 the element 9 defines a series of similar rectangles with the parts A and B included between the apex 15 and the arms 12, 13. Thus by appropriately positioning the plate 1 and the element 9 the part of the document (text or photograph) in which the operator is interested is framed. When this framing is obtained it is sufficient to screw the knob 21 in order to lock the slider on the ruler 6.

Then the operator can read from the graduations of the sides A, B and 12, 13 of the obtained rectangle the length and width thereof, while the position of the slider 11 permits him to read from the ruler 6 the length of the diagonal of the rectangle, the graduation 5 or 14 giving him the ratio of the contiguous sides of this rectangle as indicated above, and the numerical table printed or glued on the plate 1 indicating to him the surface area of the rectangle taking account of its diagonal and its proportions. Complementarily the graduations 23 indicate to the operator the focal length of the lens to be used for the apparatus for the reproduction or projection of the object defined in the obtained rectangle.

Thus the utilisation of this device is extremely simple and immediately supplies the user with all the numerical data which he needs to effect any framing, within the range corresponding to the dimensions of the aperture 4. All the readings on the graduations can be effected in sufficiently precise manner, thanks particularly to the means for locking the ruler 6 and the pivoting element 9 in the selected angular positions.

Moreover this system is of minimum bulk, much less than that of the previous known embodiment having an L-piece sliding on a pivoting rod.

The invention is not limited to the form of embodiment as described and can include numerous variants of execution. Thus it is apparent that the dimensions of the aperture 4 and the length of the ruler 6 have been given only by way of example and that any locking means equivalent to those described vcan be utilised to lock the ruler, the pivoting element 9 and the slider 11 in position. The plate 1, the element 9 and the ruler 6 can be of either plastic or metallic material, the slider 11 preferably being metallic.

I claim:

1. Device for the calculation of the characteristics of rectilinear geometric shapes comprising:
   (a) a plate having two perpendicular adjacent edges in which there is formed a rectilinear aperture and which carries at least one graduation indicating a series of ratios between the sides of corresponding rectangles,
   (b) a ruler mounted pivotably at one of its extremities on the plate and the length of which is at least equal to the diagonal of the aperture formed in the plate, the extremity of this ruler being able to intersect the ratio graduation, and
   (c) an element mounted rotatably on a slider capable of movement on the ruler, and provided with two perpendicular arms having lengths equal to those of the sides of the aperture of the plate,
   (d) at least two sides of the aperture of the plate, the arms of the pivoting element and the ruler being graduated in length.

2. Device according to claim 1, including mechanical means to lock the ruler on the plate in the selected angular position, and the slider in an angular position such that its arms are perpendicular to the adjacent sides of the aperture of the plate and with these sides define a rectangle the characteristics of which are thus a function on the one hand of the angular position of the graduated ruler and on the other of the position of the slider on this ruler, the said means consisting, for the ruler, of complementary parts fixed thereto and to the plate at suitable distances from the rotation spindle of the ruler.

3. Device according to claim 2, wherein the pivot axis of the ruler is separated from a diaganol of the aperture of the plate by a distance equal to the interval between the apex of the aperture situated on the same side of the diagonal as the pivot spindle and the said diagonal.

4. Device according to claim 1, wherein at least one of the arms of the pivoting element carries graduations of focal lengths corresponding to different film formats on which an object situated within the rectangle defined by the two movable arms and the contiguous sides of the aperture of the plate is to be photographed.

5. Device according to claim 1, wherein the square or rectangular aperture is formed in such manner that its sides are inclined at 45° to the adjacent edges of the plate.

6. Device according to claim 1, wherein the rotation axis of the element is situated at a distance from the intersection of the arms of this element equal to the distance between the pivot spindle of the ruler and the adjacent apex of the aperture, and the angle between the straight line connecting the aforementioned rotation axis and the intersection and the graduated edge of the contiguous arm is equal to the angle of inclination of the sides in relation to the edges of the plate.

* * * * *